Patented Dec. 5, 1950

2,532,997

UNITED STATES PATENT OFFICE 2,532,997

PRODUCTION OF ALKALINE EARTH SULFONATES

Charles A. Cohen, Roselle Park, N. J., assignor to Standard Oil Development Company, a corporation of Delaware No Drawing. Application November 14, 1947, Serial No. 786,135

12 Claims. (Cl. 252—33)

The present invention is concerned with an improved process for the production of alkaline earth sulfonates and more particularly with sulfonates which are produced as by-products in the manufacture of white oils. The invention is more particularly concerned with the so-called "mahogany" sulfonates, such as the sulfonates having combining weights higher than 400 calculated as free sulfonic acid. Thus the invention pertains particularly to the process of production, but it applies also to the product which results from the improved process.

While the present invention contemplates the production of substantially pure alkaline earth sulfonates, it has particular application to the production of highly concentrated oil solutions of the higher oil soluble or so-called "mahogany" sulfonates. For example, the invention is particularly useful in the production of fairly concentrated oil solutions of alkaline earth sulfonates of high quality, where the sulfonates are present in a concentration of about 30 to about 70% or more by weight in the solution. The products of the present invention preferably are substantially free of any alkali sulfonates and also free of alkaline earth halides. A particular object of the present invention is to produce such oil solutions in a convenient liquid form so as to increase their utility and make it easy to apply them to various purposes. For example, concentrated solutions of sulfonates of the character just described are very useful for addition to lubricating oils and other oleaginous liquids where they can be readily diluted to any desired concentration or strength without substantial heat or other treatment being necessary to obtain a homogeneous product.

The distinction between the higher or "mahogany" sulfonates and the lower sulfonates is well known in the art and, as pointed out above, the present invention is concerned primarily with the sulfonates of higher combining weight where the sulfonic acid, for example, has a combining weight of at least 400. Methods for determining the combining weights of sulfonic acids and sulfonates have been described in detail in A. S. T. M. procedure D855—46T. My earlier patent, No. 2,413,311, also contains a brief discussion of the method of ascertaining the combining weight of sulfonates.

The general methods for production of mahogany sulfonates from mineral oils are well known in the prior art, some of the preferred processes being fully described in my prior issued patents, Nos. 2,348,609, 2,388,677 and 2,413,311.

In general, the common procedure employed for producing an alkaline earth sulfonate is to take sodium sulfonate substantially free of sodium chloride or other contaminating salts and to dissolve such sulfonate in mineral oil to the desired concentration. Thereafter the oil solution is preferably treated with a water soluble alkaline earth salt or hydroxide. For example, in the past, calcium sulfonate has been obtained by reacting a suitable mineral oil solution, for example 30% solution, by weight, of purified sodium sulfonate with a saturated aqueous solution of calcium chloride at a suitable elevated temperature, for example 175° F. Due to the solubility characteristics of calcium sulfonate, double decomposition takes place and an aqueous brine containing sodium chloride is produced which is drawn off and discarded. The oil solution of calcium sulfonate which remains thereafter is finished by drying, air blowing and pressing, as is well understood in the art.

Alkaline earth sulfonates prepared in the manner just described are useful in many instances as lubricating oil additives. However, such products commonly do not give optimum performance as additives because of the inclusion therein of at least a small quantity of unreacted sodium sulfonate, some free calcium chloride, and/or significant quantities of sodium chloride. The effect of the chlorides, even in small concentration, is injurious particularly when used in engines operating at elevated temperatures. Lubricating oils containing sulfonates perform most satisfactorily, particularly at high temperatures, when they are free to a very high degree of chlorides, sulfonates, and alkali sulfonates.

In my prior patent, No. 2,413,311, mentioned above, a method is described for producing pure alkaline earth sulfonates in oil solution and the solutions may contain the sulfonates in normal lubricating oil concentration. The present invention makes it possible to produce highly concentrated solutions of the alkaline earth sulfonates in any chosen oil and in a manner such that highly fluid products may be obtained. The improved process involves acid treating an oil of appropriate viscosity to produce a maximum of the higher oil-soluble sulfonic acid. Such treatment is followed by contracting the treated oil with a divided filter aid, preferably diatomaceous earth or equivalent material such as silica and various commercially available filter aids, for example, one sold by the Johns-Manville Corporation under the title "JM Hyflo" which is a finely divided material of diatomaceous origin. Treatment with the filter aid is effective to remove sludge, tar, free sulfuric acid, and other finely divided organic and inorganic acids and solids known collectively as "pepper sludge" and other non-sulfonic material. Thereafter the oil is filtered, pressed to remove the sludge-filter aid complex and this is followed by air blowing to remove any residual sulfur dioxide which may remain in solution.

The acid treated, filtered and air blown oil containing in solution only the sulfonic acids, and in particular the oil soluble sulfonic acids, that is those having a combining weight of 400 and above, is next treated to extract the sulfonic acid. A quantity of 40–60% isopropyl alcohol and preferably 50% isopropyl alcohol in water is used to extract the sulfonic acids, the amount used being selected to give a final sulfonate solution in the alcohol of about 10% by weight calculated as sodium sulfonate. This particular range is not critical, but it is preferred that quantities of this order be employed. When such quantities are used and the extract contains roughly 10% of the sulfonic acids, it is found that the sulfonic acids extracted contains co-extracted oil to the extent of roughly 10% by weight, based on the acid. If the alcohol is proportioned to give a lower concentration, for example 5% of sulfonates in the extract solution, the amount of oil co-extracted is less in proportion, for example 4 to 5% by weight, based on the sulfonic acids. On the other hand, if less alcohol is used, so as to obtain a higher concentration such as 15 to 20% of sulfonic acids in the alcohol extract, the amount of oil co-extracted with the acids increases considerably. For example, in alcohol extracts containing 15 to 20% by weight of sulfonic acids the concentration of co-extracted mineral oil may be as high as 25 to 50% by weight, based on the sulfonic acids.

For practical purposes therefore a concentration in the range of 10 to 15% is preferred as being fairly efficient and economical in the use of alcohol without co-extracting excessive amounts of oil. Hence, the preferred separation range is in the neighborhood of 10% and usually not higher than about 15% of sulfonic acid or sulfonate in alcohol. The amount of alcohol, for example isopropyl alcohol, can usually be estimated with fair accuracy or it can be determined, if necessary, by simple experimentation.

The resulting sulfonic acid extract in alcohol is next mixed with a refined lubricating oil of proper viscosity and composition as required in the product which is to contain the sulfonate. The oil selected should at least be compatible with the final product even though it is intended to package and market the sulfonates in high concentration, for example 30 to 70% by weight as suggested above. The quantity of oil employed is selected so that after subsequent neutralization of the acids the desired concentration of alkaline earth sulfonate in oil will be obtained. Commonly a 30% concentration of sulfonates in lubricating oil is preferred for market purposes, through the concentration may obviously be considerably higher if desired.

After the acid extract has been mixed with the proper quantity of oil a slight excess over theoretical or stoichiometrical quantities of alkaline earth hydroxide is added and water is added to bring the final alcohol concentration within the range of 25 to 35% by voume, based on alcohol and water present in the system. The alkaline earth hydroxide, or if preferred the carbonate or mixture of hydroxides and carbonates, may be added in finely divided solid form or a saturated solution may be employed, especially in the case of the more soluble hydroxides such as barium hydroxide or strontium hydroxide. In some cases it is desirable to avoid the introduction of the carbonates and the technique of adding the hydroxide as a concentrated aqueous solution has the advantage of facilitating preparation of the sulfonate entirely free of insoluble carbonate. This may make unnecessary the filtration of the final product.

The quantity of water to be added is of considerable importance to the separation of the sulfonates from the alcohol. The proportions vary somewhat with variations in the average molecular weight of the sulfonic acids and also with the particular alkaline earth which is chosen. The solubility characteristics of the resulting alkaline earth sulfonates include the optimum concentration of water and alcohol. For example, the calcium sulfonates which are produced by reacting calcium hydroxide or carbonate with sulfonic acids having combining weight limits of 400 to about 550, are freely soluble, in at least a 10% concentration, in 50% isopropyl alcohol. On the other hand, the solubility of barium sulfonates is considerably lower than that of the calcium sulfonates, the former being readily precipitated from 50% aqueous alcohol solution.

Hence when calcium sulfonates are to be produced, instead of first mixing the acid extract with oil and then adding calcium hydroxide, the acid extract may be first neutralized with a slight excess of calcium carbonate, retaining the solution of calcium sulfonate in 50% alcohol. This solution containing the calcium sulfonate is thereafter mixed with the proper quantity of oil after which water is added to obtain a separation of the sulfonates from the alcohol.

To separate the sulfonates from the alcohol solution, as just mentioned, water is added to reduce the over-all alcohol concentration to a range of about 28 to 32% by weight for the calcium sulfonates. When this is done, a layer separation takes place in the liquid composition with the formation of a clear lower aqueous alcohol layer and a separate upper oil layer which contains all the calcium sulfonate. For other alkaline earth sulfonates the range of alcohol concentration will vary slightly, but by proper adjustment of water content and in the presence of lubricating oil it is possible to separate directly the major portion of the alcohol and water from the system, leaving the desired calcium sulfonate, or other alkaline earth sulfonate, in the oil. This has the important advantage of avoiding extensive distillation procedures hitherto required to remove all of the alcohol solvent from the system.

In working with barium sulfonates which are much less soluble in alcohol than the corresponding calcium salts, the acid extract is preferably first mixed with oil as mentioned above, and then the neutralizing agent, such as barium hydroxide, is added. In this case the normal precipitation of barium sulfonate does not take place, but the oil acts as an extraction medium forming a clear solution of the barium sulfonate and separating into a clear upper layer. During the addition of the alkaline earth hydroxide the mixture should be continuously agitated, preferably with moderate heating, to effect complete contact between the reactive ingredients, but thereafter the composition is allowed to stand to obtain the desired layer separation. As indicated above, the lower layer of a clear aqueous alcohol may then be drawn off and recovered separately.

Because of the solubility characteristics of the calcium and barium compounds, the alcohol concentration at which a clear separation of the aqueous alcohol free from dissolved alkaline earth sulfonates takes place is much higher in the case of the barium compound because of its lower solubility. In the case of the calcium sulfonates, the alcohol must be more dilute to obtain the desired layer separation. Likewise, the solubility characteristics for magnesium and strontium vary more or less inversely with their molecular weights, the magnesium sulfonates being more soluble in alcohol than the strontium sulfonates.

Normally, after mixing the various materials described, namely the acid-alcohol solution, mineral oil, alkaline earth hydroxide or carbonate, and a proper amount of water, the composition is heated to a temperature range of about 70 to 80° C., accompanied by mixing and then heat is withdrawn. The clear aqueous alcohol layer settles rapidly, leaving behind an upper layer consisting of the oil solution of the neutralized alkaline earth sulfonate. The lower layer may be drawn off and stored or otherwise handled for alcohol recovery. When a product is required having excess alkalinity an additional amount of the appropriate alkaline earth hydroxide or carbonate is added and the remainder of the alcohol and water are removed by agitation and heating to a maximum temperature of 140 to 150° C. Removal of the last traces of water may be accomplished by air blowing, or by blowing with nitrogen or other inert gas when required. As indicated above, the alkaline earth may be added either as a finely divided solid or as an aqueous solution. In the latter case no insoluble products are formed and subsequent filtration is usually unnecessary. Where the alkaline earth is added in a dry form, the final product may have a slight haze due to the normal content of the carbonate which usually accompanies commercial forms of the hydroxide.

As specific examples of the present invention, the following may be cited.

EXAMPLE I

A 500 Saybolt viscosity at 100° F. extracted pale coastal oil was treated in two dumps with a total of 15% by volume of 20% fuming sulfuric acid at a temperature of 70° C. The sludge produced at each acid dump was discarded after substantial separation by settling had taken place. The acid oil so produced contained about 13 grams of a mahogany sulfonic acid per 100 mls. of oil solution and about 2% by volume of "pepper sludge." The "pepper sludge" consists essentially of colloidally dispersed globules or particles of the water-soluble sulfonic acids admixed with free sulfuric acid, tar, and materials which on neutralization give rise to highly colored oil-soluble products. The acid oil was diluted with an equal volume of a neutral oil obtained by washing the above acid oil after neutralization with 50% alcohol and steaming to remove alcohol and water. The neutral oil obtained in this manner was dried prior to addition to the acid oil as a diluent. With the concentration of the sulfonic acid at about 6.5 grams per 100 mls. of solution, the diluted acid oil was then treated with 0.5 gm./100 ml. of a commercial filter aid, for example a siliceous material of diatomaceous origin known commercially as "JM Hyflo." Mechanical agitation for 15 minutes was employed at a temperature of 25–30° C. which was substantially ambient temperature. After contacting the acid oil with the filter aid, the mixture was filter pressed through a plate and frame press which had been previously precoated with the same filter aid using a ratio of 5 lbs. of filter aid per 100 sq. ft. of filter press area. After filtering, the oil was perfectly clear and bright and showed no pepper sludge; i. e., tar, or water-soluble sulfonates or free sulfuric acid when tested by the following method:

10 ml. of acid oil were measured into a 100 ml. A. S. T. M. conical centrifuge tube, diluted to the 100 ml. mark with normal heptane, iso-octane, A. S. T. M. precipitation naphtha or ordinary 30 to 70° C. petroleum ether, stoppered, shaken to dissolve and disperse the oil and sludge, and centrifuged for 10 min. at 2000 R. P. M. Any pepper sludge and sulfuric acid present were precipitated as a lower layer. The volume read in the tube multiplied by ten equaled the volume per cent sludge. The filtered acid oil when tested by this method showed a zero content of pepper sludge.

The oil described above was blown with air until titration with iodine showed the absence of $SO_2$. A volume of 50% alcohol was then added to the acid oil to extract the sulfonic acids in a concentration of about 10 gms. per 100 mls. of solution calculated as the sodium salt. In extracting the sulfonic acid, mechanical agitation was used for about 15 minutes at a temperature of about 50° C. Two layers formed, an upper oil layer substantially free of sulfonic acid and a lower alcohol layer containing nearly all of the sulfonic acid originally present in the acid oil prior to extraction. After separating the alcoholic solution from the oil, it was analyzed and showed the following composition:

| | |
|---|---|
| Pure sulfonate | 10.20 gms./100 mls. |
| Oil | 0.99 gm./100 mls. |
| Total acidity equivalent to sulfuric acid | .98 gm./100 mls. |
| Alcohol | 45% by volume. |

The above concentration of sulfonate was calculated as sodium sulfonate. The preparation of a 30% by weight solution of barium sulfonate from this alcohol extract is described below:

Two liters of the alcoholic sulfonic acid were added to 498 grams of a 105 viscosity (at 100° F.) coastal pale oil contained in a 4 liter beaker equipped with an agitator. The temperature was raised to 50° C. and 6 grams of barium hydroxide octa-hydrate were then added and the temperature raised to 75° C. Stirring was stopped and an immediate separation or break into two layers was obtained. An upper oil layer containing all of the barium sulfonate, and a lower alcohol layer containing a small amount of dissolved excess barium hydroxide were separated. The lower layer was drawn off and 21 gms. of barium hydroxide octa-hydrate were then added in order to obtain a product which would have a neutralization number of between 8 and 10 expressed as milligrams of KOH per gram of oil. The temperature was then raised with stirring to 140° C. at which time no further steam was evolved. A slight haze existed in the product due to a small amount of barium carbonate present in the commercial barium hydroxide used for neutralization. The oil-sulfonate solution while hot was mixed with 0.2 gm./100 ml. of the finely divided diatomaceous filter aid, agitated and Büchner filtered. The filtration rate was rapid and a dry filter cake was obtained. Inspection of the product prepared in this manner is given below in the table.

EXAMPLE II

Using the same sulfonic acid solution described in Example I, two liters of the acid alcohol solution were added to 477 gms. of the 105 viscosity (at 100° F.) pale oil. The temperature was raised with stirring to 50° C. and 59 gms. of strontium hydroxide octa-hydrate were added. The temperature was raised to 80° C. and 200 cc. of hot water were added to the mixture and agitation continued for a few minutes. On stopping agitation, the mixture separated into two clear layers; an upper oil layer containing all of the strontium sulfonate dissolved in the oil and a clear lower aqueous-alcohol layer. The lower layer was drawn off and discarded and the upper oil layer was treated with 17 gms. of strontium hydroxide octa-hydrate and the temperature raised to 140° C. while stirring. 10 grams of the same filter aid as in Example I were then added, the temperature was rapidly raised to 150° C. and the mixture was Büchner filtered. A clear fluid product was obtained, inspections for which are given below in the table.

EXAMPLE III

An acid alcohol extract obtained from the acid treatment and extraction of a similar oil as in Example I on analysis showed total acidity as sulfuric acid of 0.794 gram per 100 mls., pure sulfonate 8.86 gms./100 mls., oil 1.2 gms./100 mls. and isopropyl alcohol 39.8% by volume. The sulfonic acid had a combinining weight of 524, calculated as the free acid. 2,340 mls. of the acid extract were added to 497 gms. of a 105 viscosity pale oil; the mixture was heated to 55° C. with mechanical stirring and 62 gms. of powdered barium hydroxide octa-hydrate having a 97% purity were added. The temperature was then raised to 75° C. and 900 mls. of hot (80° C.) water were added. Thereafter the temperature was maintained for 5 minutes at 80° C. with stirring and then the agitation was stopped. Settling into two clear layers took place at once and the lower alcoholic layer was drawn off and discarded. The upper oil layer containing a small amount of water and alcohol was then treated with 22 grams of powdered barium hydroxide octa-hydrate and 0.05 ml. of a silicone fluid having foam inhibiting properties. The latter product was added to cut down on any tendency to foam during the drying procedure. The temperature was raised with stirring to 140° C., 5 gms. of diatomaceous filter aid were added, the temperature was raised with stirring to 150° C. and the product was then Büchner filtered. Inspections on the product so obtained are given below in the table.

EXAMPLE IV

An acid alcohol extract of a sulfonic acid having a combining weight of 420 was obtained by acid treating in three dumps, an extracted pale coastal oil of 105 S. S. U. viscosity at 100° F. with a total of 15% by volume of fuming sulfuric acid. After removal of the sludge the oil was treated with filter aid to remove pepper sludge and sulfuric acid, and after air blowing to remove dissolved sulfur dioxide the sulfonic acid was extracted with 50% isopropyl alcohol. Analysis of the alcohol extract showed: total acidity as sulfuric acid, 0.962 gm./100 mls., pure sulfonic acid, as sodium sulfonate—8.51 gms./100 mls., and dissolved oil 0.75 gm./100 mls. Alcohol concentration was 44.7% by volume. A quantity of sodium sulfonate was prepared by exactly neutralizing the acid-alcohol solution and was dissolved in a water-white oil in a concentration of 10% by weight calculated on an oil-free basis. The color of this product in a Lovibond tintometer using a one inch cell showed a color of yellow 4.4, red 1.1. It should be noted that this represents an unusually light colored sulfonate for preparation by commercial methods.

1500 mls. of the sulfonic acid solution described above were added with agitation to 318 gms. of a 105 S. S. U. viscosity (at 100° F.) coastal oil. 48 gms. of powdered barium hydroxide octa-hydrate were next added, the temperature was raised to 55°, and 1500 mls. of hot water were then added. The temperature was further raised to 75° C. and stirring was stopped. Immediate separation into two clear layers took place. The lower aqueous alcoholic layer was drawn off and discarded and to the upper oil solution of barium sulfonate 15 gms. of barium hydrate were added, the temperature was raised to 135° C., 9 gms. of diatomaceous filter aid were added, the temperature was raised further to 150° C. and the product was then Büchner filtered. Inspections of the product obtained are given below in the table.

EXAMPLE V 4 liters of acid-alcohol solution of the sulfonic acid described in Example IV were mixed with 41.7 gms. of calcium carbonate and the mixture heated under reflux for one hour. The solution was then filtered to remove the slight excess of calcium carbonate and a solution of neutral calcium sulfonate in 50% alcohol was thereby obtained. One liter of the alcoholic solution was added to 190 gms. of a 105 S. S. U. viscosity at 100° F. pale coastal oil. A liter of hot water was also added and the mixture heated to 80° C. Complete separation into two layers was obtained and the lower layer which showed an alcohol concentration of 31% by volume was discarded. 4 gms. of calcium hydroxide were then added and the mixture heated to 135° C., 5 grams of diatomaceous filter aid were added, the temperature was raised to 150° C. and was then Büchner filtered. Inspections are given below in the table.

Table.—Alkaline earth sulfonates from high and medium combining weight sulfonic acids

| Metal | Ex. I | Ex. II | Ex. III | Ex. IV | Ex. V |
|---|---|---|---|---|---|
| | Barium | Strontium | Barium | Barium | Calcium |
| Combining weight of acid | 507 | 507 | 524 | 420 | 420 |
| Concentration percent | 30 | 30 | 30 | 30 | 30 |
| Color, Tag Rob. | 2¾ | 2¾ | 3 | 4 | 5¾ |
| Say. vis. at 100° F. | 110 | 509 | 458 | 3,757 | 584 |
| Say. vis. at 210° F. | 36 | 67 | 61.2 | 259 | 67 |
| Open cup flash, °F. | 360 | 370 | 370 | 380 | 370 |
| A. S. T. M. Neut. No. (alk.) | 8.6 | 9.3 | 8.32 | 8.1 | 14.6 |
| Sulfated ash | 7.9 | 5.9 | 7.38 | 5.2 | |

The material of Example I was tested for a period of 125 hours in a standard Caterpillar testing engine and at the same concentration as a normal calcium sulfonate made by double decomposition, using calcium chloride. The composition of Example I gave a demerit rating of 0.15 (for the barium sulfonate) as compared to 1.0 for the calcium sulfonate made by double decomposition. This barium sulfonate thus appears to have very desirable detergent properties.

While reference has been made above to specific filter aids, it will be understood that any of numerous finely divided precipitants which are effective to assist in settling and filtering the finely divided suspended particles of pepper sludge and other impurities may be employed. Such filter aids may consist of various fines, clays and other aluminum and/or silica compositions, especially those of siliceous origin such as tripoli or finely ground silica, finely ground Carborundum, carbon of fine particle size, and the like. Various finely ground clays such as Attapulgus fines may be used, but the filter aids of diatomaceous origin are generally considered preferable.

It will also be understood that while the invention is applicable to any of the alkaline earth metal sulfonates and also to mixtures thereof in various concentrations, the range of 30 to 70% by weight of the sulfonates in mineral oil is preferred. The range may, however, be as low as 20% or as high as 80 to 85% or even more, if desired, though the narrower limits mentioned above will usually be more satisfactory.

It will be understood further that the quantities of water, added to cause layer separation of the aqueous alcohol from the oil which contains sulfonates, will be varied as required to produce optimum separation and purity of the final product. The temperatures to which the composition may be heated at various stages likewise may be varied, depending upon the type and concentrations of the various ingredients. While isopropyl alcohol is specifically referred to as a preferred extracting medium, other aliphatic or aromatic alcohols having suitable solubility characteristics for sulfonic acids of combining weight above about 400 may be substituted as will be apparent to those skilled in the art. Thus the n-propyl, n-butyl, and isobutyl alcohols, among others, are quite suitable. Also, the concentration of extracting alcohol may be varied somewhat but it should not be less than about 40% alcohol by weight in water and 50% is preferred. Higher concentrations may be used but the range of 40 to 60% is a preferred limit.

It will be obvious to those skilled in the art that various modifications may be made in the process set forth so long as the steps required for maintaining a high degree of purity in the finished product are observed.

I claim:

1. A process for producing a substantially pure oil-soluble alkaline earth metal sulfonate solution in mineral oil concentrations of the order of 30 to 70% sulfonates by weight, based on the total weight of the solution, which comprises the steps of acid treating a mineral oil with concentrated $H_2SO_4$ to produce sulfonic acid of at least 400 combining weight, contacting said treated oil with filter aid to remove suspended impurities, extracting said sulfonic acid with an aqueous water soluble aliphatic alcohol, adding mineral oil to said extract, neutralizing said sulfonic acid with a basic alkaline earth compound, and adding water to cause said aqueous alcohol to form a separate layer leaving sulfonates dissolved in said added mineral oil.

2. A process as in claim 1 wherein said basic alkaline earth compound is a calcium compound.

3. A process as in claim 1 wherein said basic alkaline earth compound is a barium compound.

4. A process as in claim 1 wherein said basic alkaline earth compound is a strontium compound.

5. A process as in claim 1 wherein said basic alkaline earth compound is calcium hydroxide.

6. A process as in claim 1 wherein said basic alkaline earth compound is barium hydroxide.

7. A process for obtaining concentrated oil solutions of substantially pure alkaline earth metal sulfonates from acid treated sludge-free oil containing sulfonic acid of at least 400 combining weight which comprises the steps of extracting said sulfonic acid with an aqueous water soluble aliphatic alcohol, adding mineral oil to said alcohol, neutralizing said extracted acid with a basic inorganic alkaline earth metal compound and adding water to said alcohol and oil composition to cause separation into a layer of aqueous alcohol and an oil layer containing concentrated sulfonates.

8. A process for obtaining a mineral oil solution of oil-soluble alkaline earth metal sulfonate of 30 to 70% sulfonate concentration by weight, which comprises contacting a sludge-free acid treated oil containing oil-soluble sulfonic acid with an aqueous solution of isopropyl alcohol to extract said acid, adding oil to said alcohol extract, neutralizing said extract with a basic inorganic alkaline earth compound, and adding water to said oil and extract to cause layer separation of said oil with the alkaline earth sulfonate in solution, the quantity of said last-mentioned oil being adjusted to provide the desired sulfonate concentration.

9. A process according to claim 7 wherein neutralization is effected by adding an aqueous solution of an alkaline earth metal hydroxide.

10. A process according to claim 7 wherein neutralization and water addition are effected by adding an aqueous solution of an alkaline earth metal hydroxide.

11. A process according to claim 7 wherein the aqueous alcohol employed for extracting is 50% isopropyl alcohol.

12. A metal for producing concentrated oil solutions of alkaline earth metal sulfonates from acid treated oil which comprises the steps of removing pepper sludge and sulfuric acid suspended impurities from said treated oil by treatment of the acid oil with a filter aid, adding an aqueous water soluble aliphatic alcohol solution of 40 to 60% alcohol concentration by volume to dissolve and extract oil-soluble sulfonic acid, adding mineral oil to said extract in proportions adjusted to the desired final sulfonate concentration, neutralizing said extract with at least the theoretical quantity of a basic inorganic alkaline earth compound, adding water to bring the over-all alcohol concentration below 35%, and heating to facilitate separation into an oil layer containing the substantially pure sulfonate and an aqueous alcohol layer.

CHARLES A. COHEN.

REFERENCES CITED

The following references are of record in the file of this patent:

UNITED STATES PATENTS

| Number | Name | Date |
| --- | --- | --- |
| 2,402,325 | Griesinger et al. | June 18, 1946 |
| 2,413,311 | Cohen | Dec. 3, 1946 |
| 2,414,773 | Showalter | Jan. 21, 1947 |
| 2,453,690 | Bray | Nov. 16, 1948 |